United States Patent
Skaloud et al.

(10) Patent No.: US 11,104,294 B1
(45) Date of Patent: Aug. 31, 2021

(54) ENERGY ABSORBING MEANS FOR AN AUTONOMOUS GROUND VEHICLE

(71) Applicant: Amazon Technologies, Inc., Seattle, WA (US)

(72) Inventors: Brett Skaloud, Seattle, WA (US); Andrew Stubbs, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 136 days.

(21) Appl. No.: 16/142,491

(22) Filed: Sep. 26, 2018

(51) Int. Cl.
*B60R 21/34* (2011.01)
*B60P 3/00* (2006.01)
*G05D 1/00* (2006.01)
*G05D 1/02* (2020.01)

(52) U.S. Cl.
CPC .............. *B60R 21/34* (2013.01); *B60P 3/007* (2013.01); *G05D 1/021* (2013.01); *B60R 2021/343* (2013.01)

(58) Field of Classification Search
CPC ... B60R 21/34; B60R 2021/343; B60P 3/007; G05D 1/021
See application file for complete search history.

(56) References Cited

U.S. PATENT DOCUMENTS

| | | | | |
|---|---|---|---|---|
| 6,543,983 | B1* | 4/2003 | Felder | B23Q 7/10 414/331.07 |
| 9,524,648 | B1* | 12/2016 | Gopalakrishnan | B64C 39/024 |
| 9,829,333 | B1* | 11/2017 | Calder | G08G 1/0112 |
| 10,000,284 | B1* | 6/2018 | Purwin | B64B 1/26 |
| 10,303,171 | B1* | 5/2019 | Brady | G08G 1/207 |
| 10,613,533 | B1* | 4/2020 | Payson | G06Q 50/28 |
| 2001/0026073 | A1* | 10/2001 | Sato | B60R 21/34 293/121 |
| 2009/0256370 | A1* | 10/2009 | Siler | B60R 19/18 293/120 |
| 2013/0193698 | A1* | 8/2013 | Nagwanshi | B60R 19/18 293/120 |
| 2015/0298443 | A1* | 10/2015 | Hundley | B32B 27/06 156/214 |
| 2015/0336524 | A1* | 11/2015 | Larner | B60R 19/18 293/120 |
| 2018/0024554 | A1* | 1/2018 | Brady | G06Q 10/08 701/23 |
| 2018/0065503 | A1* | 3/2018 | Higuchi | B60K 7/0007 |
| 2019/0054876 | A1* | 2/2019 | Ferguson | G06Q 10/0832 |

* cited by examiner

Primary Examiner — Barry Gooden, Jr.
(74) Attorney, Agent, or Firm — BakerHostetler (57) ABSTRACT

Energy absorbing means on an autonomous ground robot, which is intended for delivering packages in an uncontrolled and unprotected environment, include elastically deformable padding, crushable material, and spring-loaded or like mechanical devices.

20 Claims, 4 Drawing Sheets

ENERGY ABSORBING MEANS FOR AN AUTONOMOUS GROUND VEHICLE

BACKGROUND

The present invention relates to autonomous vehicles, and more particularly to features on an autonomous vehicles for reducing kinetic energy transferred to a person in the event of a contact.

Safety when robots encounter people is, of course, paramount. Accordingly, safety standards, such as ISO TC 184/SC, Robots and Robotic Devices—Collaborative Robots, and ANSI RIA R15.06, Robot and Robot System Safety, have been developed. A collaborative robot is designed for direct interaction with a defined collaborative workspace. A collaborative workspace is the safeguarded space where the robot system and a person (that is, a human being) can perform tasks simultaneously during production operation. The objective of collaborative robots is to combine the repetitive performance of robots with the individual skills and ability of people.

In general, safety procedures for some industrial robots (such as fixed, six access robots in an order fulfillment center) traditionally exclude personnel access to the operations area while the robot it active. Collaborative robots, at least sometimes share the same workspace with a person, and some collaborative robots may function in uncontrolled environments where events are sometimes unpredictable.

Types of collaborative robot operation, while the robot is in automatic operation, include safety-rated monitored stop, hand-guiding operation, speed and separation monitoring, and power and force limiting. In safety-rated monitored stop mode, a person may interact with the robot when it is stopped. Automatic operation resumes when the person is at a safe distance, such as when the person leaves the collaborative workspace. In hand-guiding operation, a person is in direct contact with the robot using hand controls. In speed and separation monitoring, the speed of the robot is reduced the closer an operator is a defined hazard area, and an (emergency) protective stop command is issued when a person is in potential contact. Power and force limiting is based on the principle that reducing the appropriate operating parameters (such as speed, torque, force, and the like) will minimize the harm upon incidental contact between the robot and the person. The latter operation for collaborative operation usually requires a risk assessment.

DETAILED DESCRIPTION OF ILLUSTRATIVE EMBODIMENTS

An autonomous ground vehicle (AGV) is a category of robot that might operate at times in an unprotected, uncontrolled environment. Because the AGV in some embodiments is intended to deliver packages to a residence and/or an intended recipient, the AGV disclosed herein can encounter an operator, and also possibly an untrained person who might not be intending to interact with the robot, in an unprotected, uncontrolled environment. In general, an AGV of the type disclosed herein is a ground vehicle (typically unmanned) that operates, at least in some circumstances, without the need for a human controller, and at least at some times may operate in unprotected and uncontrolled environment. The AGV may use sensors to develop an understanding of the environment (sometimes only a limited understanding), which is then used by control algorithms to determine the next action to take in the context of a human-provided mission goal.

An AGV, both in general and in the context of a delivery AGV disclosed herein, in an uncontrolled, unprotected environment may have the ability to:

access information about the environment (such as maps of streets, sidewalks, and buildings, and in some cases building interiors);

detect people, obstacles (such as curbs, steps, bumps, slopes, and the like), objects (such as landscaping, gates, and the like), and surfaces (such as lawns, cobblestones, sidewalk cracks and discontinuities, and the like), and then evaluate and take action based on the detection; and travel under its own power to waypoints, usually by battery power and without human navigation assistance, taking into account the above information and detection.

In some circumstances, an AGV's onboard control system may be able to autonomously learn, such as adjusting strategies based on input about the surroundings, adapt to surroundings without outside assistance, and the like.

A particular subset of autonomous ground vehicles is an AGV that navigates to a desired residential or commercial location to carry an object, such as a package containing a commercial product. For example, United States Patent Application Number 20180024554, titled "Autonomous Ground Vehicles Based At Delivery Locations," which is assigned to the assignee of the present invention, discloses AGVs that retrieve items from transportation vehicles (e.g., delivery trucks) for delivery to specified locations (e.g., user residences, a commercial business, etc.). In various implementations, the AGVs may be owned by individual users and/or may service a group of users in a given area (e.g., in an apartment building, neighborhood, etc.). The AGVs may travel out (e.g., from a user's residence, apartment building, etc.) to meet a transportation vehicle (e.g., a delivery truck on the street) to receive items, and may be joined by other AGVs that have traveled out to meet the transportation vehicle, and may line up in a particular order (e.g., according to delivery addresses, etc.). After the items are received, the AGVs may travel back (e.g., to the user residences) to deliver the items, and may be equipped to open and close access barriers (e.g., front doors, garage doors, etc.). The AGV may also be equipped with a locked lid that can be opened only by an intended recipient.

The present invention uses the phrase "delivery AGV" or "AGV for package delivery" or other combinations of the terms "AGV" and "delivery" to refer to AGVs having the structure, capabilities and function to navigate to a desired location, such as by navigating public or private sidewalks or neighborhoods, to transport a package to a desired customer or residential or commercial location. Accordingly, a delivery AGW includes an internal chamber for holding a package payload and is limited in speed, such as to 6 mph, 10 mph, or 15 mph, as determined by the particular design guidelines and possibly by state regulation. In this regard, these speed are referred to herein as low speed.

As illustrated in the figures, the delivery AGV 10 disclosed herein includes a body 20, a chassis 30, a power supply system 40, and a control system 50. Body 20 includes a body has a periphery formed by sidewalls 22, including lateral walls 23s and end walls 23e, that enclose the sides an internal chamber 24. Chamber 24 is suitable for holding an object, such as a conventionally boxed object in intended for delivery to an intended recipient.

In the embodiment of the figures, body 20 includes a lid 26 that is hinged to one of the walls 22. Lid 26 preferably is locked in a manner that enables unlocking by the intended recipient, as explained more fully below. Lid 26 encloses chamber 24 from above.

A chassis 30 can include any type of suspension for enabling supporting body 20 on wheels 34. For example, linkages, springs, shock absorbers, and the like may be employed to isolated chamber 24 from shocks from driving over the ground. A steering mechanism may be employed to move at least a pair of the wheels in the desired direction to facilitate steering. The present invention is not intended to be limited to any type of chassis, steering, suspension, and the like. Six wheels 34 are shown in the figures, each having a rubberized other otherwise soft tire, and any number and type of wheels are tires are contemplated.

Power system 50 can include a power supply, such as conventional rechargeable batteries, and an electric motor to provide power to the wheels 34. For example, some wheels 34 may be on fixed axles while a pair of drive wheels—one on each side of AGV 10, may each be connected to a motor (not shown in the figures). The control system may power both the left and right motors at equal speed to propel AGV 10 in a straight line, or may power one motor at a higher speed to turn AGV as needed, or may power the drive wheels in opposing directions to rotate AGV 10 without translation (that is, rotate in place). The control algorithms for controlling the straight-ahead movement, turning, and rotating AGV 10 are well known, as will be understood and employed by persons familiar with battery powered vehicles.

Control system 50 includes sensors 60 and other components and systems used for navigation and guidance, avoiding objects, image-capture and sensing, power management, communications, security, and other functions inherent in achieving the goals of a delivery AGV. Sensors 60 can be mounted behind a forward facing panel 28F and/or a rearward facing panel 28R (not shown). Sensors 60 can include cameras having images sensors including image signal processing, light sensors, and the like, with corresponding processing including image decoding, lens correction, geometrical transformation, video stream transcoding, video analytics, image capture, and compression to provide obstacle detection and obstacle identification. Sensors for determining speed may also be employed. Panel 28F (and 28R) can be transparent polymer, such as (for example) acrylic, Plexiglas, or polycarbonate.

Sensors 60 can include RADAR sensors, such as SRR (Short-range radar) applications and MRR/LRR (mid-range radar, long-range radar) applications; LiDAR sensors, such as infrared LIDAR systems that with the aid of a Micro-Electro-Mechanical System (MEMS), which use a rotating laser, or a solid-state LIDAR. Control system 50 can also include GPS modules, inertial guidance modules such as an inertial measurement unit (IMU) having gyroscopes and accelerometers (preferably in each of the x, y, and x directions), power management modules to control power, overall consumption, and thermal dissipation. Other modules, components and functions are contemplated.

Control system 50 and sensors 60 may also be employed in controlling the driving and turning of AGV 10 during normal conditions. For example, a speed sensor on the wheels, sensors on motor current and/or voltage, gps, accelerometer, gyroscope, optical sensors, and the like may be employed to determine a safe straight-ahead speed, safe turning radius and velocity for the vehicle and package (taking into account the possibility of encountering a person who might not see or be expecting the vehicle), safe stopping distance to provide feedback to the controller for determining the speed, and the like.

Control system 50 may also include a package delivery module and corresponding sensors. For example, a sensor can be associated with a closed position of lid 26 to assure that a package to be delivered to a residential or commercial destination is secure in chamber 24 during transport. A means for unlocking a lock on lid 26 (or unlocking a actuator for lid 26 or like means) can include a keypad, a wireless communication system (for working with wifi, cellular data, bluetooth, or other communication means to send a signal to the lock upon verification), a facial or fingerprint recognition module, or the like may also be included.

Control system 50 controls the movement of AGV 10 to a desired destination, the delivery of a package within chamber 24 to an authorized recipient, and/or movement of AGV 10 to a home location. In this regard, the description of control system 50 and sensors 60, and United States Patent Application Number 20180024554 and/or industry practice in view of the present disclosure may inform the functions in this regard.

It is, of course, the goal of control system 50 to avoid unintentional contact, especially for people, pets, and the like. Contact is referred to herein as transient contact to distinguish it from intentional, low-force contact (such as opening the lid to access a package) and contact over a significant period, such as leaning against or placing a foot on the robot, of the type that is not a risk, or is a low risk, of injuring a person. In the event of transient contact, the energy absorbing means disclosed herein are intended to diminish the magnitude of energy transmitted to a person by an AGV, compared with an unmodified solid or rigid surface of prior art AGVs currently commercialized.

Figure 1:
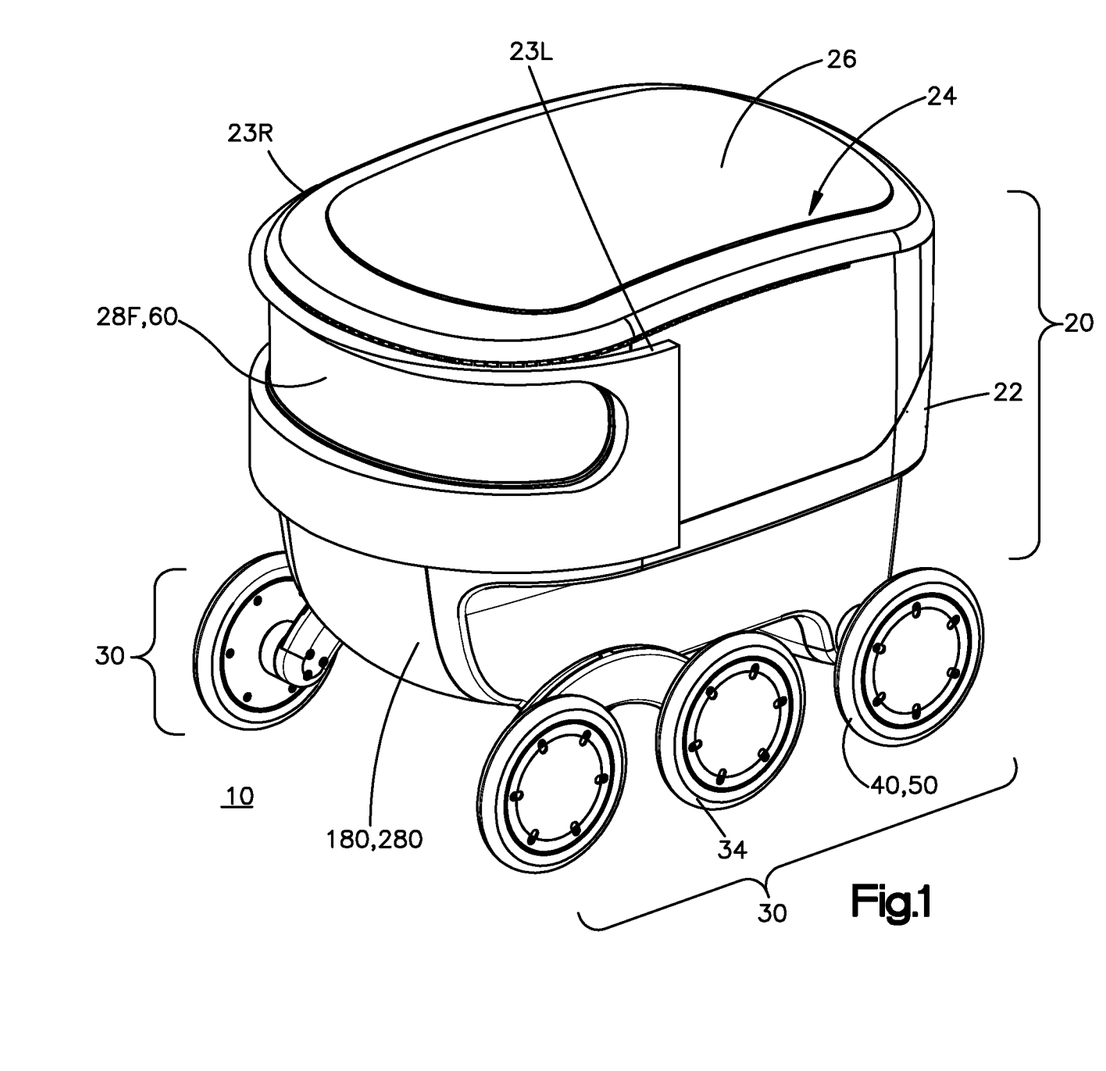
FIG. 1 is a perspective view of an example of an autonomous ground vehicle (AGV) incorporating aspects of an embodiment of energy absorbing means.

As illustrated in FIG. 1, the energy absorbing means can be an elastic padding 180 coupled to at least a leading portion of the body. In the illustration of FIG. 1, padding 180 extends over the entire leading surface of AGV 10, including above and below front sensor window 28F, and on the left and right side (as oriented facing the direction of forward movement of AGV 10) of sensor window 28F. Further, elastic padding 180 extends on left and right shoulders 23L and 23R of body 20, and extends the fully vertical length of body 20 such that no unpadded surface on the front projection of AGV 10 (except as convenient for uncovering the sensors) is exposed. In this regard, the entire forward facing surface consists of panels that are covered by padding 180 and the sensor window 28F. Padding 180 may also be installed on the rear and sides of AGV 10. The sensor window 28F is not covered, and recessed relative to a front face of padding 180, which recessing diminishes the risk of transient contact directly to sensor window 28F Elastic padding 180 can be any type for absorbing energy by deflection and then returning to its original shape or near its original shape. For merely illustrative examples, padding 180 can be one to four inches of eva foam, cross-linked polyethylene foam, pvc nitrile, other foams (such as porous foams), or the like. In general, gels are effective as padding but in some circumstances are relatively heavy; gel performance can also be affected by temperature, and possesses a limited range of compression due to a lack of porosity. Foams often are lighter and more compressible than gels. Thus, a choice between a gel and a foam or other material may be made according to the particular application conditions according to the known parameters of the materials. The term "padding" is used herein to refer to a material that is capable of absorbing mechanical force and/or kinetic energy. The thickness of foam 180 may be chosen according to the particular characteristics of the foam chosen, the mass and expected speed of the AGV and its payload packages, and the like, understanding that increasing the outside dimensions of the AGV, while possibly increases the chance of transient contact by providing a bigger object. Thus, a tradeoff in padding thickness may be required, with the goal of safety of persons and/or pets remaining most important.

Data from optical sensors, accelerometers, gyroscopes, motor power draw, and the like may be employed to sense transient contact or less than transient contact. Optionally, proximity sensors and/or contact sensors (not shown in the figures), may be employed to sense when transient contact occurs, even through padding 180. A control signal may be sent through a communications module that is part of control system 50 to signal that transient contact has occurred. Preferably, the control system 50 disables AGV 10 upon transient contact until the transient contact can be investigated. Alternatively, or used with padding 180 in one or more layers, a padding 280 can be a crushable or plastically deformable material that is suitable for absorbing energy upon impact with a person. For example, padding 280 can be a crushable material, for example a metal matrix, a polymer matrix, an expanded polystyrene foam (EPS), expanded polypropylene foam (EPP), and/or other plastically deformable foam, or a like material. Examples of a matrix is a honeycomb that is configured to deform and/or fracture in response to an impact while absorbing energy. An example of an aluminum matrix material is Plascore CrushLite™.

Thus, plastically deformable material 280 can be crushed (deformed) upon transient contact, and during the crushing process absorb kinetic energy for the purpose of reducing force or impact to the person, pet, or the like that is party to the transient contact. The controller 50 may function as described above with respect to transient impact involving padding 180 and/or 280.

Figure 2:
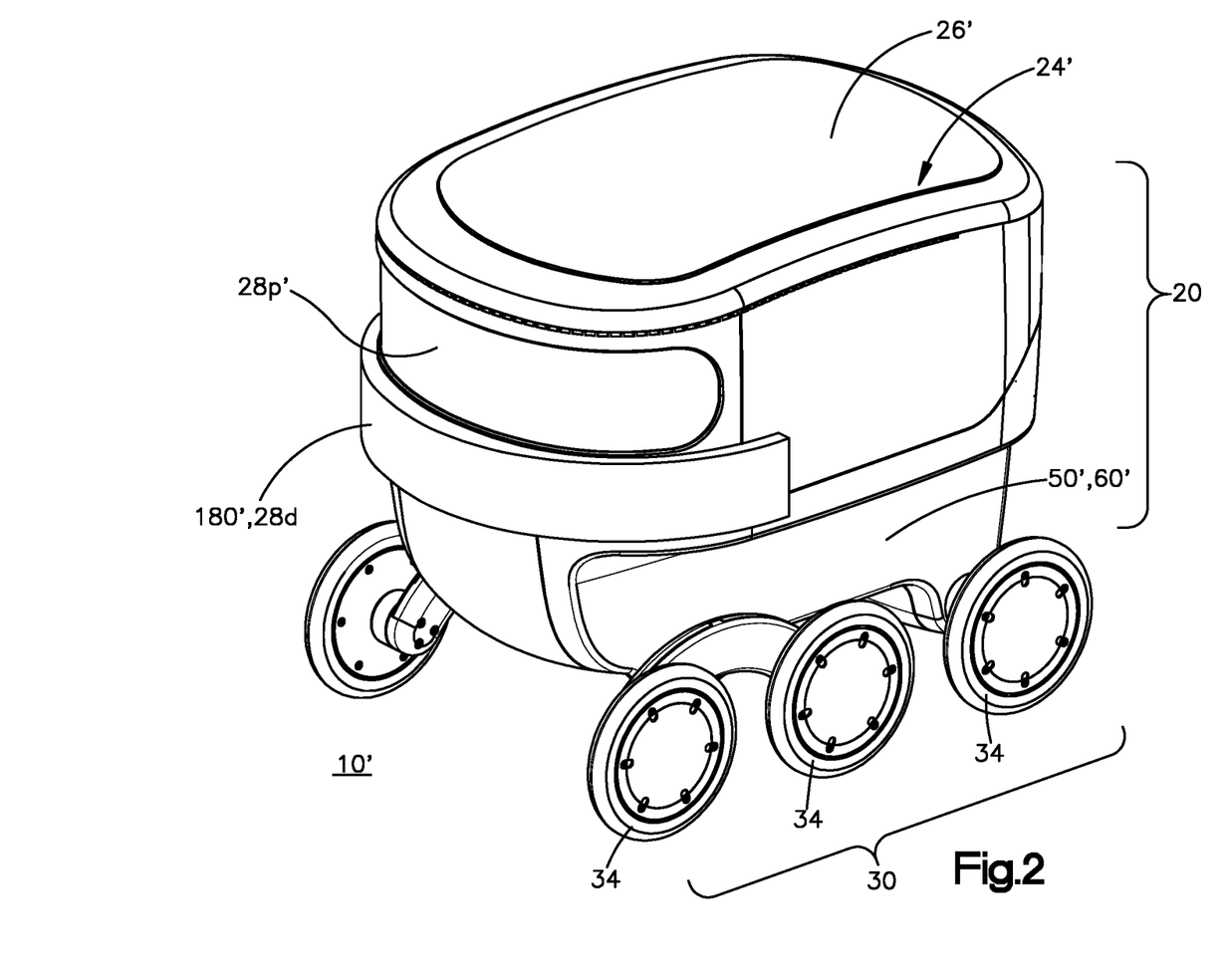
FIG. 2 perspective view of an example of an autonomous ground vehicle (AGV) incorporating aspects of a second embodiment of energy absorbing means.

Referring to FIG. 2, an AGV 10' includes a body 20', a chassis 30', a power supply system 40', and a control system 50', which can have the same structure and function as described for first embodiment body 20, chassis 30, power supply system 40, and control system 50. AGV 10' includes a strip of elastically deformable padding 190' for absorbing energy upon transient contact with a person.

Strip 190' preferably is at the forward-most portion of body 20' to increase the likelihood of being effective at absorbing kinetic energy upon transient contact with a person, as it is most likely that the forward-most portion of body 20' will be the region of transient contact.

Padding 190' can be of the same material as padding 180 described for first embodiment AGV 10. Alternatively, AGV 10' can include a crushable material 290', as described above for crushable material 280. Padding strip 190' and/or 290' may (for merely one example) be employed on AGV configurations and/or environments where it is expected that only the forward-most portion of the AGV (such as the forward-most face of the padding 190'/290') would be the point of transient contact. As padding 180/280 and 190'/290' may also be provided on the sides are rear of the AGV, in some cases strips 190'/290' can be appropriate for sides and/or rear of an AGV while padding 180/280 is employed in other portions of the AGV.

Figure 3:
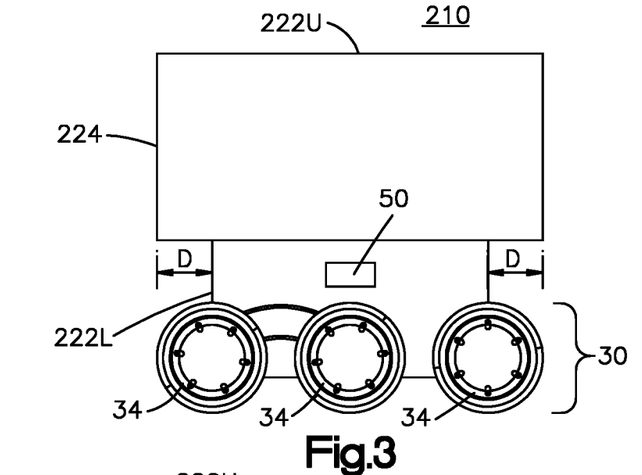
FIG. 3 is a schematic side view of an autonomous ground vehicle illustrated in an operating state.
Figure 4:
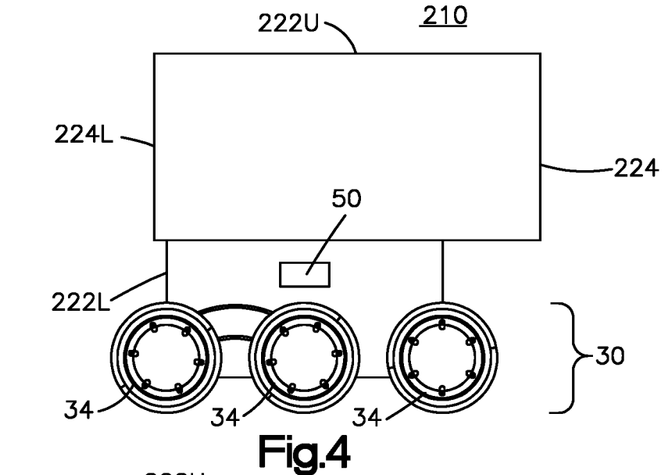
FIG. 4 is a schematic view of the autonomous ground vehicle in after an impact.

Referring to FIGS. 3 and 4, an AGV 210 is illustrated schematically. AGV 210 includes a body 220, a chassis 230, a power supply system 240, and a control system 250. Body 220 includes an upper body portion 222U and a lower body portion 222L. In the operational position, shown in FIG. 3, upper body portion 222U is centered on lower body portion 222L. Centering of the upper body over the lower body has benefits for stability; it is not required for the operation of the energy absorbing means. Preferably, upper body portion 222U overhangs lower body portion 222L by an overhang dimension D to promote transient contact with upper body portion 222U while diminishing the risk of transient contact with lower body portion 222L and the chassis, especially wheels 34.

A chamber 224 may be formed in upper body portion 222U or in both the upper and lower portions 222U and 222L. Power supply system 240 may be as described above for first embodiment control system 40. Because of overhang D, it is less likely that transient contact occurs with lower body portion 222U. Thus, where padding 180/280 and/or 190'/290' is combined with the split configuration of body portions 222*u*/222L, the padding preferably is on upper body portion 222U. Other configurations, such as padding also on portions of lower body portion 222L, other protections against risk of contact with wheels 34, etc., are contemplated.

Control system 250 may be as described above, plus a sensor that monitors the operational position of upper body portion 222U relative to lower body portion 222L and provides a signal upon displacement of upper body portion 222U relative to lower body portion 222L. In embodiments having overhang, D, when AGV 210 is moving forward, the forward-most portion the AGV 210 is the forward-most portion of upper body portion 222U.

As illustrated schematically in the figures, the entire front face of AGV 210 is flat, which is not required. Consistent with the schematic, the upper body portion 222U (and preferably effectively all of upper body portion 222*u*) projects over lower body portion 222L and wheels 234. Thus, the most likely place on AGV 210 for transient contact to occur is on the front face of body 222U. If AGV 210 is moving backwards, or inadvertent transient contact with a person occurs from the rear either while AGV 210 is stationary or moving forward, the mostly likely place for transient contact to occur is on the rear face of upper body portion 222U. Padding, as described above, may be chosen for AGV 210 accordingly, consistent with the parameters and principles described herein.

Figure 5:
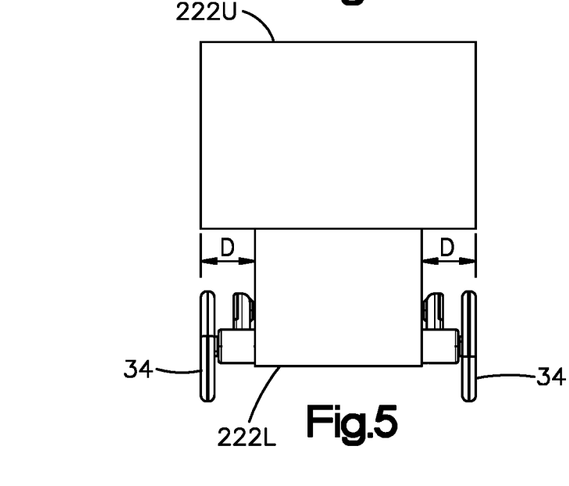
FIG. 5 a schematic end view of an autonomous ground vehicle illustrated (add inset) in an operating state.
Figure 6:
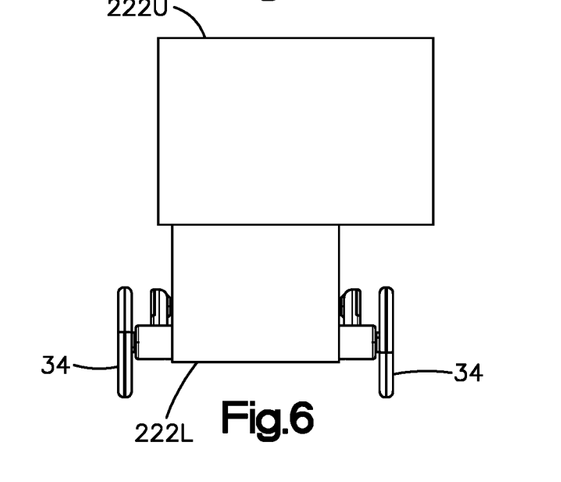
FIG. 6 is a schematic view of the autonomous ground vehicle in after an impact.

FIGS. 5 and 6 schematically shown AGV 210 from a side view. As illustrated in the figures, each side face of AGV 210 is flat, and thus the entire side face of upper body portion 222U projects laterally over lower body portion 222L and laterally outwardly over and beyond wheels 234. Thus, the most likely place on AGV 210 for transient contact to occur from the side is on the side face of body 222U. Padding, as described above, may be chosen accordingly, consistent with the parameters and principles described herein.

An AGV, such as AGV 10 may also have its front wall, end wall, and/or sidewall formed entirely of padding, such as any type and material described above. For merely one example, a sidewall formed of a crushable, aluminum or plastic matrix, such as a honeycomb or like material, may be structurally sound for the desired purpose of delivering packages while preventing unauthorized access to the chamber, while providing the energy absorbing characteristics described herein.

Figure 7:
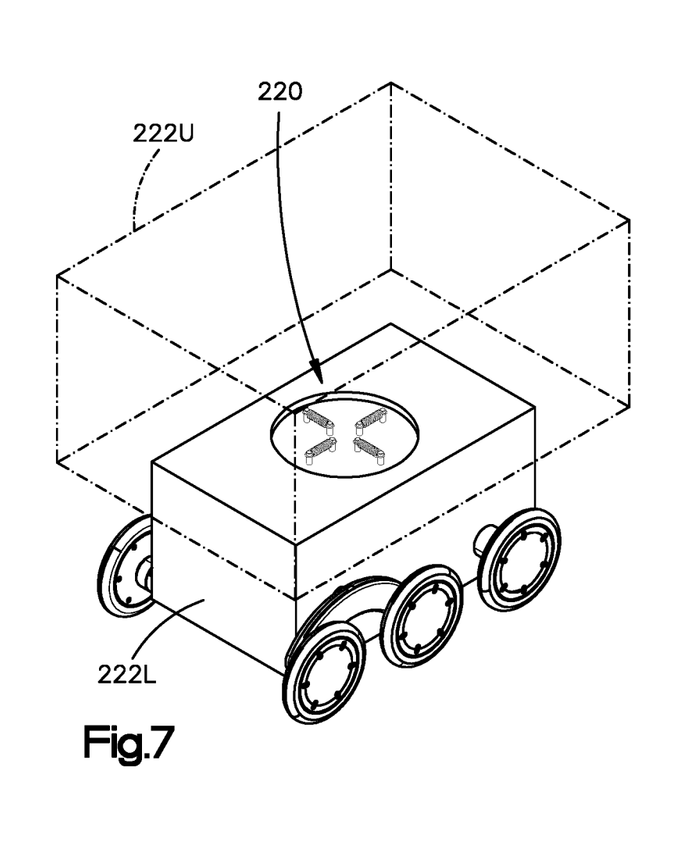
FIG. 7 is a schematic view of the autonomous ground vehicle of FIGS. 3 through 6, with a portion shown transparent.
Figure 8:
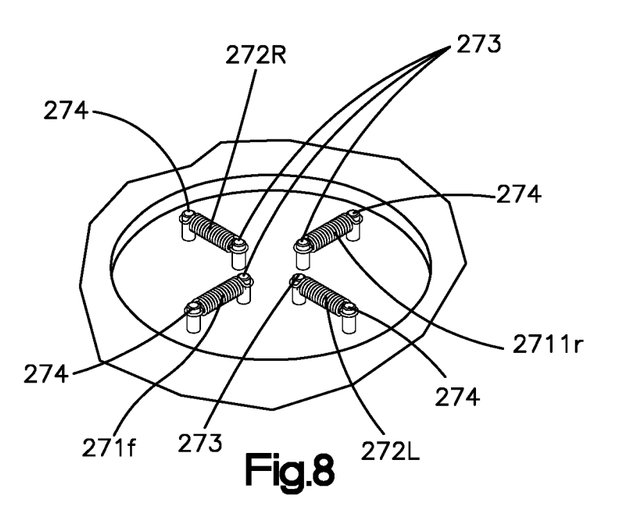
FIG. 8 is an enlarged view of a portion of FIG. 7.

FIGS. 7 and 8 illustrate an energy absorbing mechanism 270 that also is a center biasing mechanism that retains upper body portion 222U in an operational position relative to lower body portion 222L that, in the embodiment shown in the figures, is a centered position. Mechanism 270 includes a pair of longitudinal springs 271 and a pair of transverse springs 272. Each one of the springs 271 and 272 has one end coupled to a bracket 273 that is affixed to and protrudes from upper body portion 222U and another end that is coupled to a bracket 274 that is affixed to and protrudes from the lower body portion 222L. Brackets 273 and 274 can take any form, and are shown in the figures as pins or studs. The springs are illustrated as helical springs, and any type of spring, with straightforward and corresponding changes to the mounting brackets, may be employed.

Upper body portion 222U is biased into its center position (FIGS. 3 and 5) longitudinally by springs 271*f* and 271*r* and laterally by springs 272L and 272R. The designations "f" and "r" refer to front and rear ones on springs 271 and "R" and "L" to right and left ones of springs 272. For example, rearward movement of upper body portion 222U relative to lower body portion 222L elongates the front spring 271*r* and compresses the rear one of springs 271*r*, which causes each spring to provide a force that resists rearward movement (although applying a restoring force by each opposing spring is not required, as the springs can be configured and/or preloaded so that only one spring provides a restoring force in some instances). Similarly, a rightward displacement of upper body portion 222U relative to lower body portion 222L, right spring 272R compresses and left spring 272L elongates, created a centering force in each spring 272*r* and 272L. The springs may also be include a pre-load, as desired. The springs may have spring constants chosen for the configuration, each of the spring constants may be the same or vary according to the desired application, and number of springs may be increased or decreased, as desired.

For small forces applied to and small displacement of upper body portion 222U from lower body portion 222L below a predetermined threshold, such as might occur from vibration from normal motorized rolling, minor impact from a pothole or irregularity in pavement, forces inherent in traveling up or down an incline, and the like, springs 271 and 272 can retain upper body portion 222U in its operational, centered position. Mechanism 270 can be configured to absorb energy even for small forces that create the minor displacement below the predetermined threshold described herein. Position sensors (of any type, not shown in the figures) may be employed to provide a signal to controller 250 that upper body portion 222U is in its operational position.

For a transient contact or other contact that is more than a predetermined threshold, springs 271 and 272 can be chosen (such as by length and spring constant) to permit displacement of the upper body portion 222*u* relative to lower body portion 222L, thus promoting energy absorption by mechanism 270 from the transient impact. Further, a sensor (not shown in the figures) can be provided to produce a control signal to the controller that a transient contact has occurred, which may cause AGV 210 to be disabled or shut down until an operator can investigate the transient contact, and/or take other appropriate action.

The magnitude of the energy absorption, the displacement of upper body portion 222U relative to lower body portion 222, and the predetermined force threshold that can be chosen according to known parameters, such as expected speed of AGV 210, whether other energy absorption means (such as the padding described above) is employed on the AGV, mass of AGV 210 and upper body portion 222U, maximum and minimum weights of the payload (in the case of delivery robot, the expected weight of the packages), and like parameters that are intended to be optimized to promote safety of people.

The present invention is not limited to energy absorbing means that are or that use springs, as it will be clear to persons familiar with the mechanics of AGVs in view of the present disclosure that the springs can be replaced with a dashpot (such as an air cylinder or hydraulic cylinder) having the desired displacement characteristics. Horizontal and/or vertical cantilevered member (not shown in the figures) that bend under the minor displacement described above may be employed. The cantilevered members can absorb energy while deflecting, deflect enough to permit movement of upper body portion 222U relative to lower body portion 222L such that the displacement sensor sends a displacement signal to the controller, and (optionally) fracture upon sufficient force.

Moreover, the function of absorbing energy upon displacement of upper body portion 222U relative to lower body portion 222L can be performed by a wide variety of materials and structures, such as any that which can elastically and/or plastically deforms to absorb energy. In this regard, the materials described above for padding 180 or 190' (for the exterior of the AGV) may be installed between upper and lower body portions 222U and 222L. The material may be formed into connectors or spacers between body portions 222U and 222L that deform to absorb energy upon relative displacement of the body portions.

Figure 9:
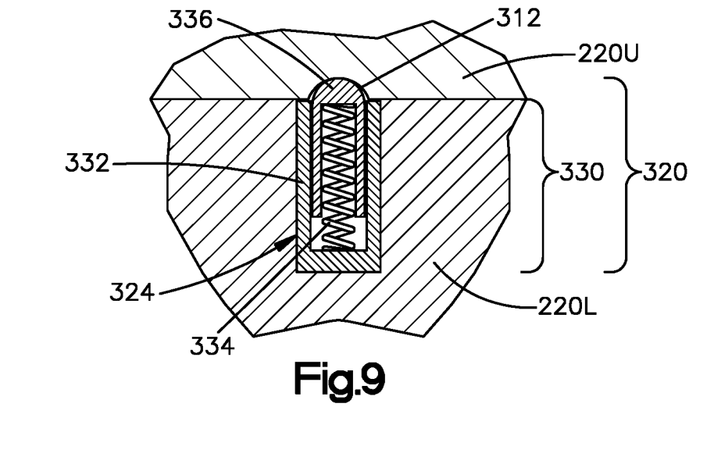
FIG. 9 is an enlarged, cross sectional view of a portion of FIG. 7.

FIG. 9 illustrates a detent 320 for retaining upper body portion 222U at a desired position, which is centered in the figures, relative to lower body portion 222L. Detent 320 may be employed with any energy absorbing means and can affect the properties of the energy absorbing means, as the detent mechanism may perform some or all of the function of retaining the body portions 222*u* and 222L in registration during the application of the small forces to the AGV (that is, forces not associated with transient contact with a person), described above.

Detent 320, as illustrated in the figures, includes a dimple recess 322 in upper body portion 222U, and a plunger assembly 330 in lower body portion 222L and installed in a cylindrical recess 324 therein. Plunger assembly 330 includes a body 332, a spring 334, and a ball 336. Spring 334 biases ball 336 upwardly (in the orientation of the FIG. 9) against stops that retain ball 336 within body 332. Accordingly, ball 336 can be moved downwardly upon sufficient force to overcome the biasing force of spring 334.

As illustrated, ball 336 protrudes into the dimple 322 of upper body portion 222*u*. According to the normal function of a detent, the detent 320 requires a minimum force to horizontally displace upper body portion 222*u* from lower body portion 222L. Detent 320 can aid in the centering of body portions 222U and 222L during assembly and/or operation, may aid in indicating when a sufficient magnitude of displacement has occurred, and may require a minimum force for the displacement to overcome the retaining force of the detent.

For example, detent 320 can be employed with a corresponding sensor for indicating that AGV 210 is in an operational mode with upper body portion 222U aligned with lower body portion 222L. The sensor can be calibrated with the alignment, or the position of detent 320 itself may be incorporated into the control system. And detent 320 can provide sensory information to an assembler, by providing an audible click or resisting sliding movement between the upper and lower body portions during assembly. During operation, detent 320 will resist displacement of upper body portion 222U relative to lower body portion 222L during some of the small forces described above. In this regard, the force required to overcome detent 320 may be chosen to be below a force that is capable of injuring a person or pet. Thus, detent 320 may perform the function of retaining the desired position of upper body portion 222U relative to lower body portion 222L and/or verifying the appropriate position thereof in an operational position.

When combined with the energy absorbing means (180, 280, 190', 290', and/or 270, or the like) described herein, detent 320 enables the AGV to receive a minimum threshold force without any displacement of upper body portion 222U relative to lower body portion 222L, while maintaining safety to people and pets. Then, upon enough force to dislodge ball 336 from dimple 322, the energy absorbing means can perform its function of absorbing force to mitigate risk of injuring a person. Any combination of signals indicating dislodging of ball 336 from dimple 322, minimum threshold of displacement of upper body portion 222u from lower body portion 322L, and/or activation of the energy absorbing means may be used to send an alarm, disable the AGV operation, contact an operator or investigator, or like action.

The present invention has been illustrated by using examples of possible embodiments. The present invention is not limited to the structure, function, and/or materials set out herein. Rather, it is intended that the invention be given its broadest appropriate scope. For merely some examples, examples of elastically deformable padding and plastically deformable padding is for illustration only, as it will be clear to persons familiar with padding materials that many suitable substitutions are well known and can be used herein, according to known parameters for choosing the materials. The mechanical means (springs, dashpots, etc.) that may be employed as the energy absorbing means can be designed in any configuration, and are provided to illustrate the concepts generally disclosed herein.

We claim:

1. A delivery autonomous ground vehicle (AGV) comprising:
    a body including an upper portion, a lower portion, and a chamber defined by the upper portion, the chamber being configured to hold at least one package;
    a biasing mechanism to bias the upper portion into an operational position relative to the lower portion;
    a lid releasably covering the chamber;
    wheels coupled to the body; and
    a drive for powering the wheels such that the wheels transport the body on the ground,
    wherein the upper portion is configured to be displaced from the operational position relative to the lower portion to reduce energy transmitted to an object upon transient contact between the delivery AGV and the object.

2. The delivery AGV of claim 1, wherein the body includes panels formed of a plastically deformable material that are configured to be plastically deformed upon the transient contact.

3. The delivery AGV of claim 1, wherein the delivery AGV has a total height of less than 30 inches.

4. The delivery AGV of claim 1, further comprising a chassis supporting the body, wherein the wheels are coupled to the chassis.

5. The delivery AGV of claim 1, wherein the upper portion extends beyond the lower portion.

6. The delivery AGV of claim 1, further comprising a controller configured to disable or shut down the delivery AGV upon transient contact between the delivery AGV and the object.

7. The delivery AGV of claim 1, further including a detent that registers the upper portion relative to the lower portion while the delivery AGV is in the operational position.

8. The delivery AGV of claim 1, wherein the biasing mechanism comprises at least one spring to bias the upper portion into the operational position relative to the lower portion.

9. The delivery AGV of claim 8, wherein the at least one spring comprises a pair of longitudinal springs and a pair of transverse springs to bias the upper portion into the operational position that is centered relative to the lower portion.

10. The delivery AGV of claim 1, wherein the upper portion is releasably attached to the lower portion.

11. The delivery AGV of claim 10, further comprising a detent adapted to releasably retain the upper portion in an operational position relative to the lower portion.

12. The delivery AGV of claim 1, wherein the body further includes a plastically deformable padding on a leading portion of the body.

13. The delivery AGV of claim 12, wherein the plastically deformable padding comprises at least one of a metal matrix, a polymer matrix, an expanded polystyrene (EPS) foam, expanded polypropylene (EPP) foam, and a deformable gel.

14. The delivery AGV of claim 12, wherein the plastically deformable padding is in the form of a strip.

15. The delivery AGV of claim 1, wherein the body further includes elastic padding on a leading portion of the body.

16. The delivery AGV of claim 15, wherein the elastic padding comprises at least one of an Ethylene-Vinyl Acetate (EVA) foam, a cross-linked polyethylene foam, a Polyvinyl chloride (PVC) nitrile foam, an open cell foam, a rubber, or an elastomer.

17. The delivery AGV of claim 15, wherein the body further includes elastic padding on a trailing portion of the body.

18. The delivery AGV of claim 15, wherein the elastic padding is in the form of a strip.

19. The delivery AGV of claim 15, further wherein the elastic padding covers substantially all of the leading portion of the body.

20. A delivery autonomous ground vehicle (AGV) comprising:
    a body including an upper portion, a lower portion, and a chamber defined by the upper portion, the chamber being configured to hold at least one package;
    a lid releasably covering the chamber;
    wheels coupled to the body;

a drive for powering the wheels such that the wheels transport the body on the ground; and a controller configured to disable or shut down the delivery AGV upon transient contact between the delivery AGV and an object, wherein the upper portion is configured to be displaced relative to the lower portion to reduce energy transmitted to the object upon the transient contact between the delivery AGV and the object.

\* \* \* \* \*